US011721051B2

United States Patent
Mahoney et al.

(10) Patent No.: US 11,721,051 B2
(45) Date of Patent: Aug. 8, 2023

(54) IMAGING PRODUCT SELECTION SYSTEM

(71) Applicant: KODAK ALARIS, INC., Rochester, NY (US)

(72) Inventors: Kathleen A. Mahoney, Spencerport, NY (US); Ronald S. Cok, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 16/185,796

(22) Filed: Nov. 9, 2018

(65) Prior Publication Data

US 2019/0130626 A1 May 2, 2019

Related U.S. Application Data

(63) Continuation of application No. 12/914,120, filed on Oct. 28, 2010, now Pat. No. 10,127,697.

(51) Int. Cl.
*G06T 11/60* (2006.01)
*G06F 3/048* (2013.01)
*H04N 1/00* (2006.01)
*H04N 1/387* (2006.01)

(52) U.S. Cl.
CPC .............. *G06T 11/60* (2013.01); *G06F 3/048* (2013.01); *H04N 1/0044* (2013.01); *H04N 1/00132* (2013.01); *H04N 1/00196* (2013.01); *H04N 1/387* (2013.01)

(58) Field of Classification Search
None
See application file for complete search history.

(56) References Cited

U.S. PATENT DOCUMENTS 5,926,253 A * 7/1999 Uchiyama ............ G03B 27/462 355/39
7,340,676 B2 * 3/2008 Geigel ............... H04N 1/00132 715/788
2002/0122067 A1 * 9/2002 Geigel ............... H04N 1/00172 715/788
2003/0007123 A1 * 1/2003 Broderick .......... G06Q 30/0601 351/159.74
2005/0152002 A1 * 7/2005 Shirakawa ............. H04N 23/00 358/1.18
2005/0196040 A1 * 9/2005 Ohara .................. H04N 1/6052 382/167
2006/0155612 A1 * 7/2006 Haeberli ............ G06Q 30/0621 705/26.5
2006/0285150 A1 * 12/2006 Jung .................. H04N 1/00347 358/1.15

(Continued)

OTHER PUBLICATIONS

"Firefox for Dummies," Blake Ross, Wiley Publishing Inc. 2006, pp. 88-97.

*Primary Examiner* — Haimei Jiang
(74) *Attorney, Agent, or Firm* — Hogan Lovells US LLP

(57) ABSTRACT

A computer system for selecting image products includes a display for displaying digital images, and for displaying representations of image products. Digital images are composited into the displayed representations to form digitally composited image product views. Programming controls displaying the composited image product views separately from the unselected representations. One or more of the displayed composited image product views are selected and assembled or fabricated.

18 Claims, 8 Drawing Sheets

LET US CHERISH THE GIFTS OF FAMILY AND FRIENDS THIS HOLIDAY SEASON. WE WISH YOU HEALTH, COMFORT, AND PROSPERITY IN THE YEARS TO COME.
SELECT
HAPPY HOLIDAYS
WISHING YOU JOY DURING THIS FESTIVE SEASON
SELECT X
WISHING YOU A JOYOUS CHRISTMAS AND A HOLIDAY SEASON FILLED WITH LOVE AND LAUGHTER.
SELECT
SELECT X
SELECT
HAPPY THANKSGIVING
BEST WISHES FOR A MERRY CHRISTMAS AND A HAPPY NEW YEAR
SELECT

(56) References Cited

U.S. PATENT DOCUMENTS

2007/0246526 A1* 10/2007 Elgar .................... G06Q 30/00 707/E17.096
2008/0148153 A1* 6/2008 Lee ..................... G11B 27/034 715/730
2008/0192129 A1* 8/2008 Walker .................. H04N 23/66 348/231.2
2008/0195962 A1* 8/2008 Lin ........................ G06F 16/40 715/771
2009/0116752 A1* 5/2009 Isomura ................. G06F 16/58 382/224
2009/0164561 A1* 6/2009 Ono .................. H04N 1/00156 715/243
2009/0219580 A1* 9/2009 Cornell ................ H04N 1/0035 358/425
2010/0174993 A1* 7/2010 Pennington ............ G06F 16/44 715/810
2010/0271490 A1* 10/2010 Jung ........................ H04L 9/32 348/207.1
2011/0029914 A1 2/2011 Whitby et al.
2011/0099471 A1* 4/2011 Manijak ................... G06T 1/00 358/1.18
2011/0106743 A1* 5/2011 Duchon .................. G06F 16/35 706/46
2011/0227939 A1* 9/2011 Inoue ................. H04N 21/6587 345/589
2011/0282686 A1* 11/2011 Venon ................... G16H 80/00 715/753
2012/0084731 A1* 4/2012 Filman ................... G06F 16/51 707/E17.084
2013/0198602 A1* 8/2013 Kokemohr ............. G06F 16/41 715/233
2019/0130626 A1* 5/2019 Mahoney ............ H04N 1/0044

* cited by examiner

SELECT X

87

88

IMAGING PRODUCT SELECTION SYSTEM

CROSS REFERENCE TO RELATED APPLICATION

This application is a continuation of U.S. patent application Ser. No. 12/914,120, filed on Oct. 28, 2010, which issued as U.S. Pat. No. 10,127,697 and is hereby incorporated by reference in its entirety. Reference is also made to commonly assigned U.S. patent application Ser. No. 12/914,100 by Mahoney, filed on Oct. 28, 2010 and entitled "Imaging Product Selection Method", the disclosure of which is incorporated herein by reference in its entirety.

FIELD OF THE INVENTION

The present invention relates to combining images with imaging-related products to provide an improved aesthetic combination.

BACKGROUND

Products that include images are a popular keepsake or gift for many people. Such products typically include a picture taken by an individual that is inserted into a product intended to enhance the product, the presentation of the image, or to provide storage for the image. Examples of such products include picture albums, posters, picture calendars, picture mugs, picture ornaments, picture mouse pads, and picture post cards.

Images can also be combined with other images, for example templates including background images and one or more image openings into which an individual's image can be inserted, either mechanically or electronically with a computer, to form a combined image that displays the individual's image in a pleasing or preferred manner. These image products can be provided in hard-copy form, for example as a printed photo-book, or in electronic form presented by a computer, for example in an on-line album. Imaging products can also include multi-media products, especially when in electronic form, that, for example, can include motion image sequences or audio tracks.

Selecting suitable multi-image and multi-media product designs can be a daunting challenge for users, particularly when the products include personal images. In particular, combining personal images with pre-existing products can pose challenging aesthetic issues. Software tools that execute on computers can assist users in designing customized multi-image products. Such software products can execute, for example, on home computers. Alternatively, on-line design and printing services accessible through an internet browser interface can assist users in designing and printing a multi-image product.

Such software and internet design tools can enable users to position personal images or other multi-media elements in a multi-image product, such as a photo-book or collage. For example, users can drag-and-drop image icons into openings in a visual representation of a multi-image product to specify the multi-image product, for example as is done in the on-line image printing business of the Kodak Gallery. However, such an approach to designing a multi-media image product can be very difficult, as a very large number of different layouts are available and selecting from among them can be tedious, time-consuming, and anxiety-inducing for a user. Alternatively, software and internet design tools include automated layout software that will position a user's images in various locations in a template without intervention, as is taught for example in U.S. Pat. No. 7,340,676.

Automated selection and layout methods, however, do not always select the best or preferred layout for a product as desired by a user. Manual selection and composition can be extremely tedious. The computational requirements for compositing or demonstrating user images with image products can be large, degrading the interactivity of the operations. Furthermore, it is difficult to display and compare a large number of customized choices.

There is a need therefore, for an improved method for selecting image products customized with user images.

SUMMARY OF THE INVENTION

In accordance with a preferred embodiment of the present invention, there is provided a computer system for selecting image products, which includes a display for a GUI, for displaying digital images, and for displaying representations of image products. Storage in the system stores the representations and the digital images from a user using the GUI. A pointing mechanism or a tab mechanism (software) is used to select a subset of the displayed representations. Received digital images are composited into the subset of the displayed representations to form digitally composited image product views. Programming controls displaying the composited image product views separately from the unselected representations. One or more of the displayed composited image product views are selected by mouse or by hard or soft keys that tab through the views, or by screen touch directly on the product view. The selected image product corresponding to the selected composited image product views is then assembled or fabricated. A server computer is typically utilized to provide these tools and facilities, such as a GUI, and is connected to a remote client computer through a computer network for providing these to the remote client computer. The remote client computer includes a browser and the server provides it with web pages comprising a version of the GUI suitable for web pages. An image can be selected by a user as usual (explained above) for compositing into each of the selected subset of displayed representations. A preferred status can be assigned to each of the subset for controlling a prioritized display of the product representations. A GUI facility for transacting a purchase of the image product corresponding to the selected one or more of the displayed composited image product views is also provided. The display of selected representations and images is performed under control for separate display either in a different area on screen or on a different screen. If a web page version of the GUI is implemented, then these can also be displayed under different browser tabs. A printer is used to print selected digital images to be placed in the image product if the product is a frame, for example. Other means are used if the product is a mug for example.

Another preferred embodiment of the present invention comprises a network connected computer system with a display terminal for displaying digital images and representations of image products under a computer system user's control. The system includes storage for digital images and representations of the image products. The digital images are retrieved from an image database accessible by the computer system and a GUI enables a computer system user to select these and to select a subset of the representations of the image products. A software tool composites the selected one or more of the digital images into each of the selected representations to form selectable composited image product views. Only the selected composited image product views are then displayed. The GUI enables the user to select one or more of the composited image product views. A display manager displays only the selected composited image product views. Fabrication or assembly is performed as necessary manually or by equipment provided.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

According to the present invention, an image product is a product that includes a user's personalized images incorporated into an image-related object, such as for example a photo-book, a picture greeting card, a picture mug, or other image-related product. The images can be positioned in specified pre-determined locations or can be adaptively positioned according to the sizes, aspect ratios, orientations and other attributes of the images. Likewise, the image sizes, orientations, or aspect ratios included in the image product can be adjusted, either to accommodate pre-defined templates with specific pre-determined openings or adaptively adjusted for inclusion in an image product. For example, an image selected by a user can be cropped, reduced in size, or enlarged, either automatically according to an algorithm or manually by the user.

Figure 6:
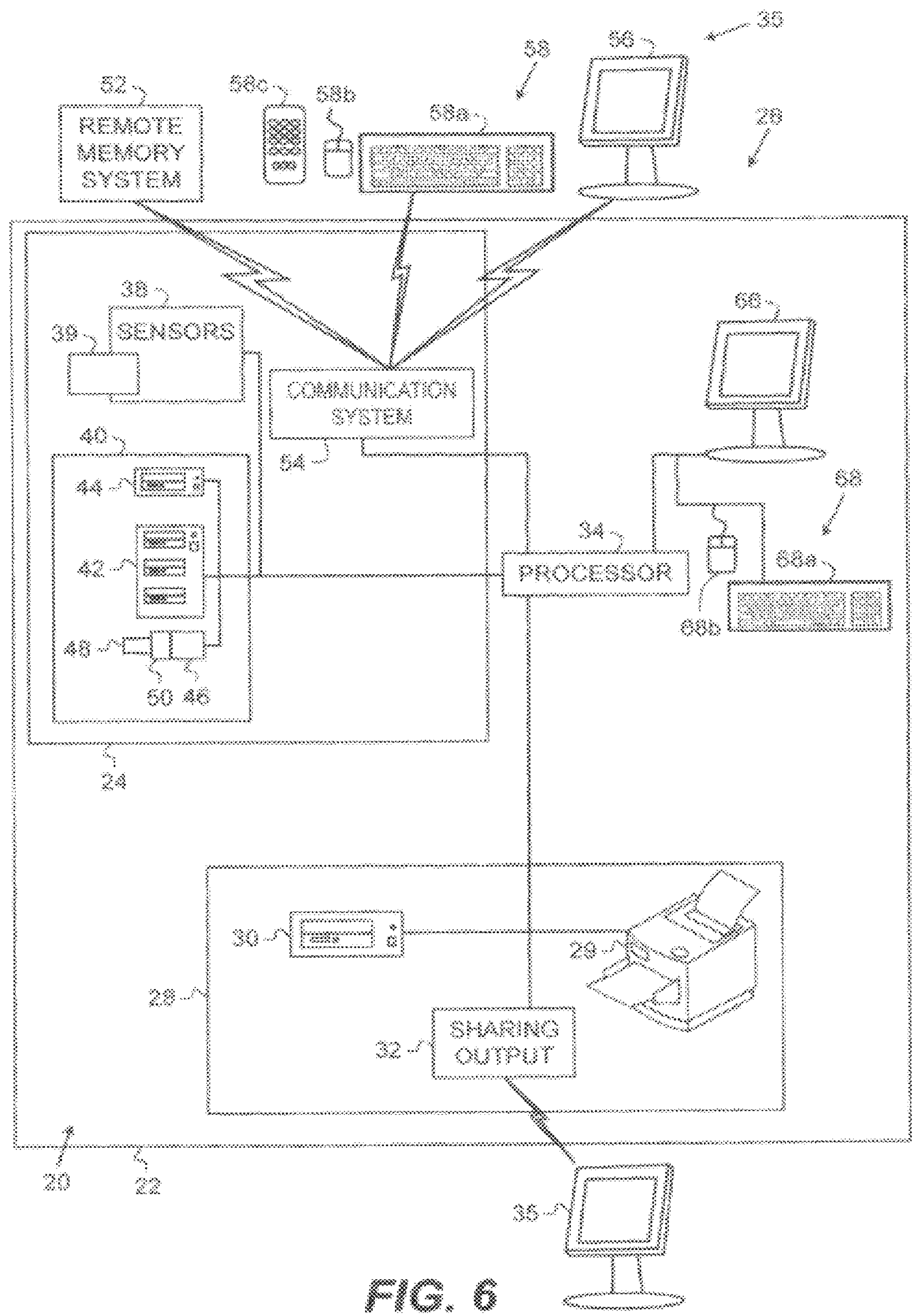
FIG. 6 is an illustration of a preferred embodiment of a system for generating an image product.

FIG. 6 illustrates a first preferred embodiment of an electronic system 20 that can be used in generating an image product. In the embodiment of FIG. 6, electronic system 20 comprises a housing 22 and a source of content data files 24, a user input system 26 and an output system 28 connected to a processor 34. The source of content data files 24, user-input system 26 or output system 28 and processor 34 can be positioned within housing 22 as illustrated. In other preferred embodiments, circuits and systems of the source of content data files 24, user input system 26 or output system 28 can be positioned in whole or in part outside of housing 22.

The source of content data files 24 can include any form of electronic or other circuit or system that can supply digital data to processor 34 from which processor 34 can derive images for use in forming an image-enhanced item. In this regard, the content data files can comprise, for example and without limitation, still images, image sequences, video graphics, and computer-generated images. Source of content data files 24 can optionally capture images to create content data for use in content data files by use of capture devices located at, or connected to, electronic system 20 and/or can obtain content data files that have been prepared by or using other devices. In the preferred embodiment of FIG. 6, source of content data files 24 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the preferred embodiment of FIG. 6, system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the preferred embodiment shown in FIG. 6, system 20 has a communication system 54 that in this embodiment can be used to communicate with an optional remote memory system 52, an optional remote display 56, and/or optional remote input 58. The optional remote memory system 52, optional remote display 56, optional remote input 58A can all be part of a remote system 21 having an input station 58 having remote input controls 58 (also referred to herein as “remote input 58”), can include a remote display 56, and that can communicate with communication system 54 wirelessly as illustrated or can communicate in a wired fashion. In an alternative preferred embodiment, a local input station including either or both of a local display 66 and local input controls 68 (also referred to herein as “local user input 68”) can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful preferred embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This allows such a user to make a designation of content data files to be used in generating an image-enhanced output product and to select an output form for the output product. User input system 26 can also be used for a variety of other purposes including, but not limited to, allowing a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the preferred embodiment shown in FIG. 6, user input system 26 includes an optional remote input 58 including a remote keyboard 58*a*, a remote mouse 58*b*, and a remote control 58*c* and a local input 68 including a local keyboard 68*a* and a local mouse 68*b*.

Remote input 58 can take a variety of forms, including, but not limited to, the remote keyboard 58*a*, remote mouse 58*b* or remote control handheld device 58*c* illustrated in FIG. 6. Similarly, local input 68 can take a variety of forms. In the preferred embodiment of FIG. 6, local display 66 and local user input 68 are shown directly connected to processor 34.

Figure 7:
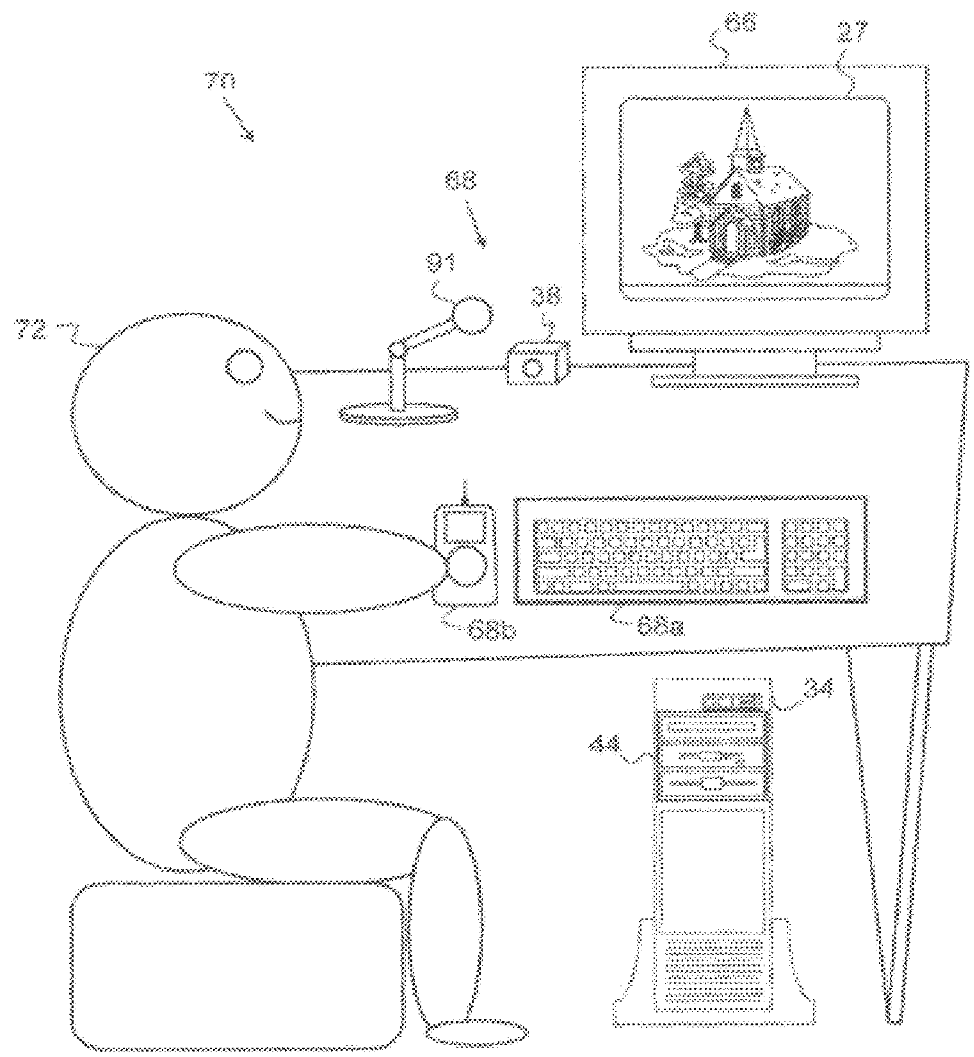
FIG. 7 is an illustration of a preferred embodiment of a desktop computer, work station, or kiosk that can be used in a system of FIG. 6.

As is illustrated in FIG. 7, local user input 68 can take the form of a home computer, an editing studio, or kiosk 70 (hereafter also referred to as an “editing area 70”) that can also be a remote system 35 or system 20. In this illustration, a user 72 is seated before a console comprising local keyboard 68*a* and mouse 68*b* and a local display 66 which is capable, for example, of displaying multimedia content. As is also illustrated in FIG. 7, editing area 70 can also have sensors 38 including, but not limited to, video sensors 39, audio sensors 74 and other sensors such as multispectral sensors that can monitor user 72 during a production session.

Output system 28 is used for rendering images, text or other graphical representations in a manner that allows image-product designs to be combines with user items and converted into an image product. In this regard, output system 28 can comprise any conventional structure or system that is known for printing or recording images, including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale, or sepia toned images. As will be readily understood by those skilled in the art, a system 35, 20 with which a user interacts to define a user-personalized image product can be separated from a remote system (e.g. 35, 20) connected to a printer, so that the specification of the image product is remote from its production.

In certain preferred embodiments, the source of content data files 24, user input system 26 and output system 28 can share components.

Processor 34 operates system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Figure 8:
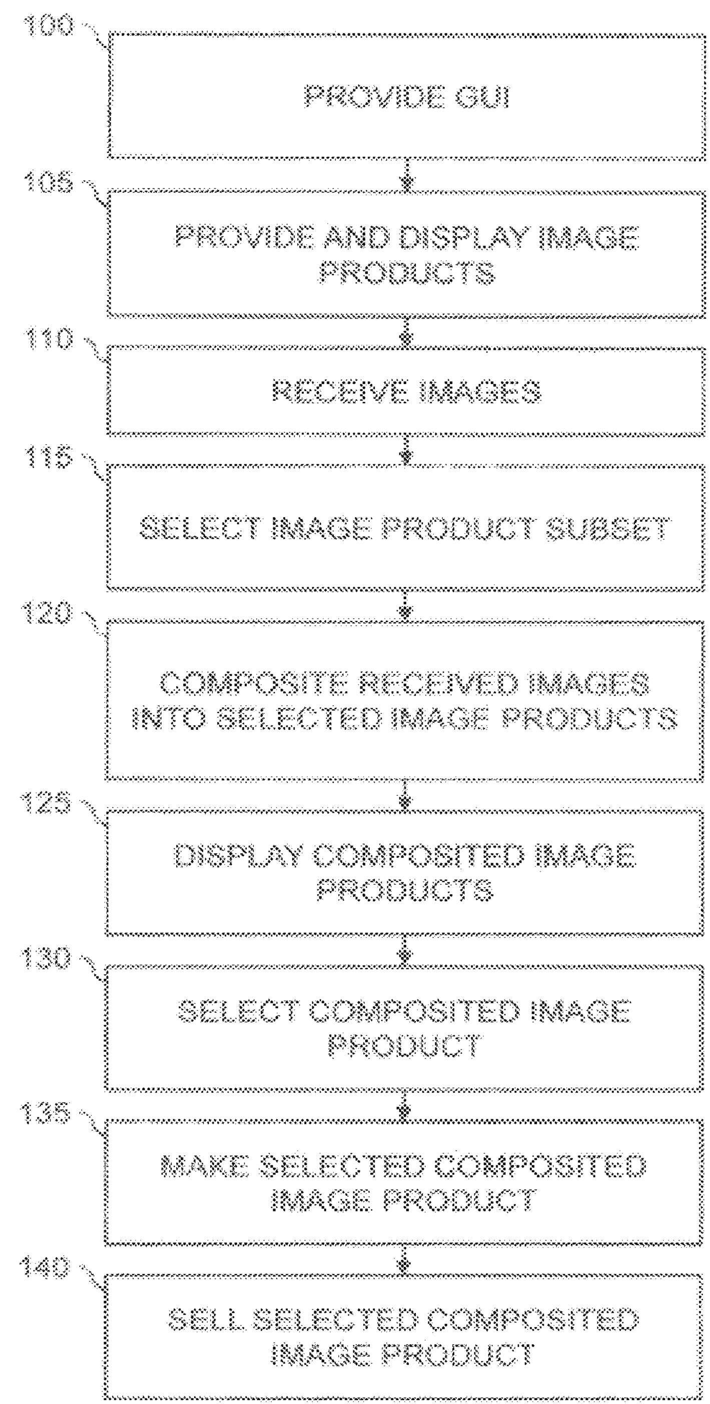
FIG. 8 is a flow chart illustrating a method according to a preferred embodiment of the present invention.

The system 20 of FIGS. 6 and 7 can be employed to make an image product. Referring to FIG. 8, in a method of the present invention, a personalized image product can be made by providing a graphic user interface (GUI) on a computer for displaying images and image products in step 100. For example, the systems 20 and 35 of FIGS. 6 and 7 can provide such a graphic user interface 27 illustrated in FIG. 7 on local display 66. Such systems are known in the computing arts. In step 105, a plurality of different image products are provided and displayed in the GUI 27. One or more images are received from a user 72 who accesses an image store by operating the GUI 27 in step 110. Images can be received through the communication system 54 or computer network (e.g. the internet), from digital storage (e.g. 40) or can be made by scanning an image print, slide, or other media.

Figure 1:
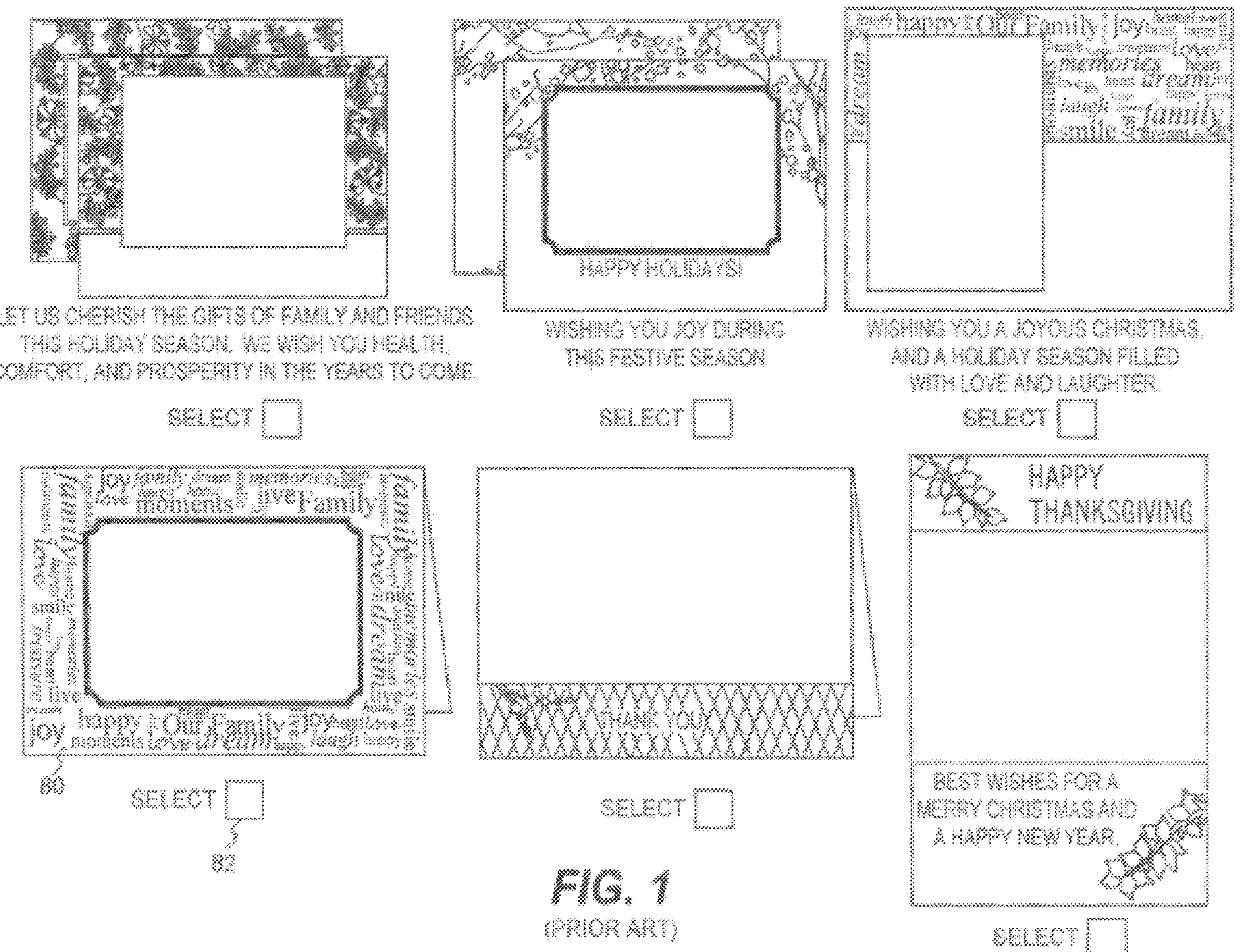
FIG. 1 illustrates a set of image products as known in the prior art.
Figure 2:
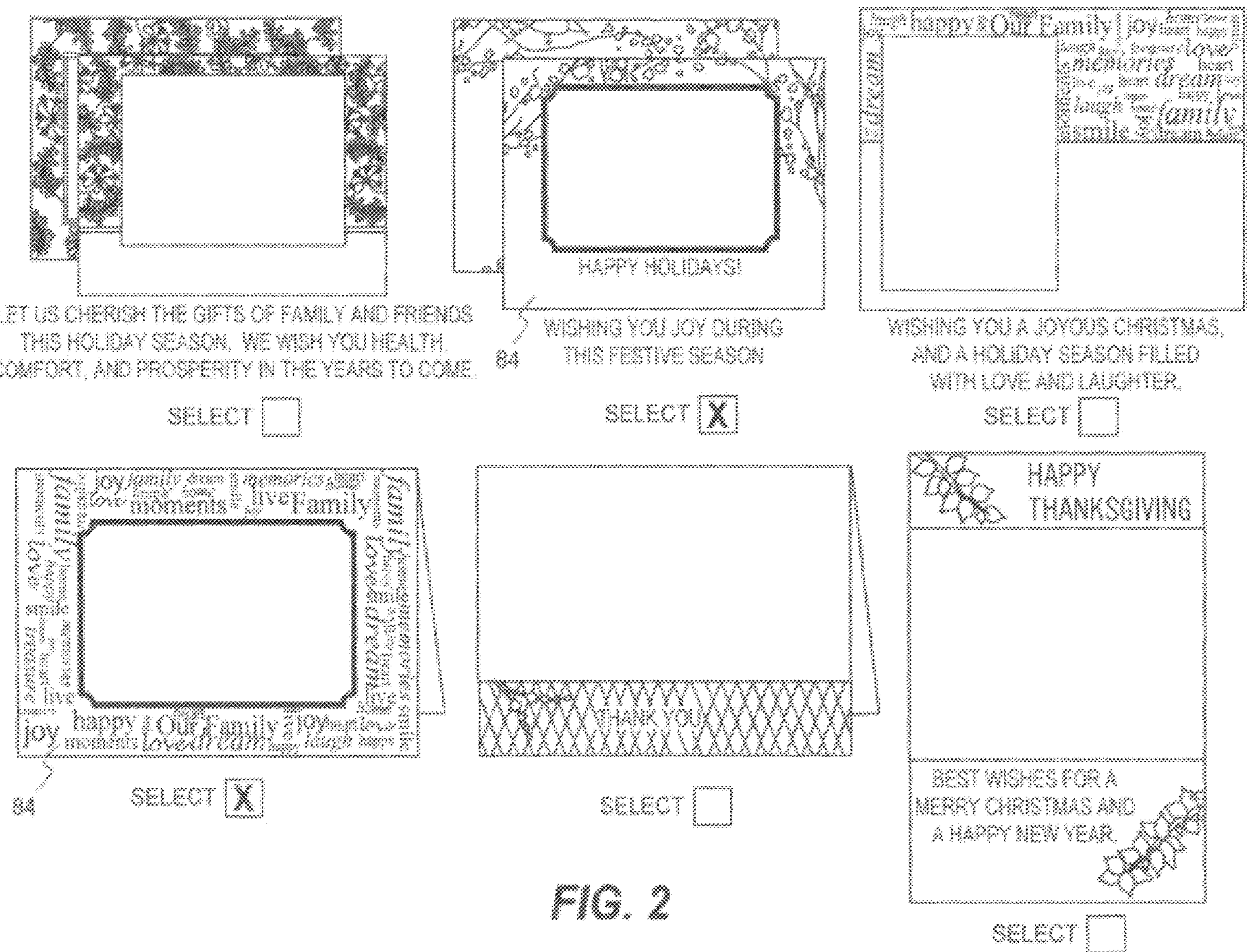
FIG. 2 illustrates the selection of a subset of displayed image products according to a step in a method according to a preferred embodiment of the present invention.

Referring back to FIG. 8, means are provided, for example to a remote user interacting through a web interface, to select a subset of the displayed image products in step 115. FIG. 1 illustrates a variety of image products such as are known in the prior art. These image products can be displayed in a web page and can include a variety of different image products and product types. For example, as illustrated in FIG. 1, single cards and bi-fold cards can be used, as well as other types of image products described above. Referring to FIG. 2, a one or more image products 80 can be selected, for example by checking a selection box 82 provided in a graphic user interface. According to various preferred embodiments of the present invention, users can select a desired images or image products with a pointing device such as a mouse-controlled cursor or pointer in the graphic user interface.

Figure 3:
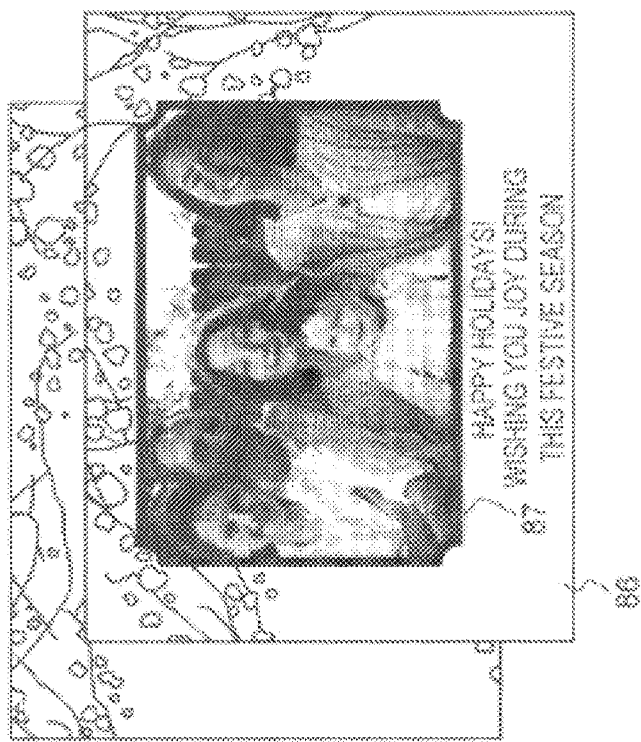
FIG. 3 illustrates the composition and display of a selected user image into the selected subset of displayed image products according to a step in a method according to a preferred embodiment of the present invention.

Referring to FIG. 3 and step 120 of FIG. 8, received images 87 (for example, images selected by a user) are composited into each of the selected displayed products to form a composited image product view 86 for each of the selected image products 84. The composited image product views 86 are displayed together in a single area in the GUI separately from the unselected image product views, which can include displaying the selected image product views on a separate screen where the unselected image product views are not displayed, in step 125. Displaying the composited image product views in a single area enables the user to more readily compare the composited image product views to make a selection from among the composited image products. In step 130, a user selects a desired displayed composited image product 88, such as shown in FIG. 4. Making or fabricating, the selected composited image product with the corresponding selected received image is performed in step 135. In a further preferred embodiment of the present invention, a GUI can be provided in step 140 to transact a sale of the selected image product, for example to the user or the provider of the received images.

In one preferred embodiment of the present invention, a preferred status is automatically detected and imparted to each of the selected image products. For example, as illustrated in FIG. 4, the images can be ordered from left to right in an order that represents the best choice to the worst choice, according to a criterion programmed in the server computer. The criterion can vary, for example including detecting matching colors, content, or image quality, and can be provided in image processing algorithms. By ordering the choices, a user can make better decisions faster.

(When used herein, the term displayed image product refers to a representation of an image product shown in the graphic user interface of a display and does not refer to the image product itself. Likewise, a view of an image product or a composited image product is a representation shown in the graphic user interface of a display. To select an image product or a composited image product is to preferentially indicate a representation of the image product or the composited image shown in the graphic user interface of a display. In common usage in the art, to display an image object is understood to mean the same thing as to display a view of the image object, and to select an image object is to preferentially indicate a view of the image object on a display screen. To make the selected composited image product is to physically render, manufacture, assemble, or fabricate it into an object, not to display a view of the composited image product.)

Rendered images of the selected product can be communicated to third parties for approval, review, sale, etc. Communications received from the third party can be employed for making modifications or for forming a decision with respect to the selected products. In other preferred embodiments, a remote third party who receives a communication can engage in the selection process for digital image selection, or corresponding product selection. The third party can match selected digital images to one or more of the image products of interest and communicate their preferences to the user. In a further preferred embodiment, a third party that receives an image, or a web page via link sent to the third party, can purchase the selected composited image product using the same or different GUI or software tools as the first user. In particular, the present invention includes transacting a sale of the selected composited image product to a third party selected by the user. The user can provide an email address of the third party wherein the computer system will forward the electronic file containing the selected composited image product to the third party over the network.

Images received from user can be derived from a variety of sources including, in one preferred embodiment of the present invention, from a stored set of user images, on either the client computer (for example a user's home computer) or a web server operated by a business that provides image product services.

Figures 4A, 4B:
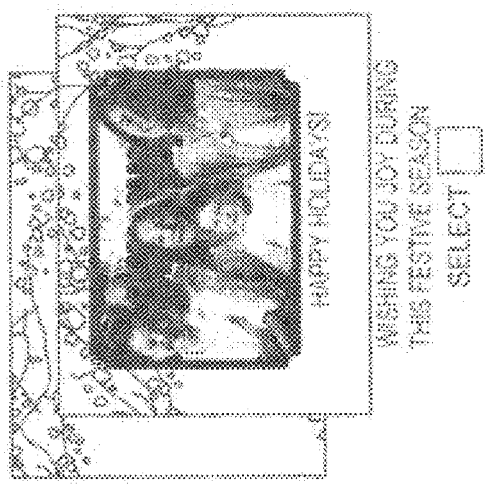
FIGS. 4A-B illustrate the selection and then display of one composited displayed image product according to a step in a method of a preferred embodiment of the present invention.
Figure 5:
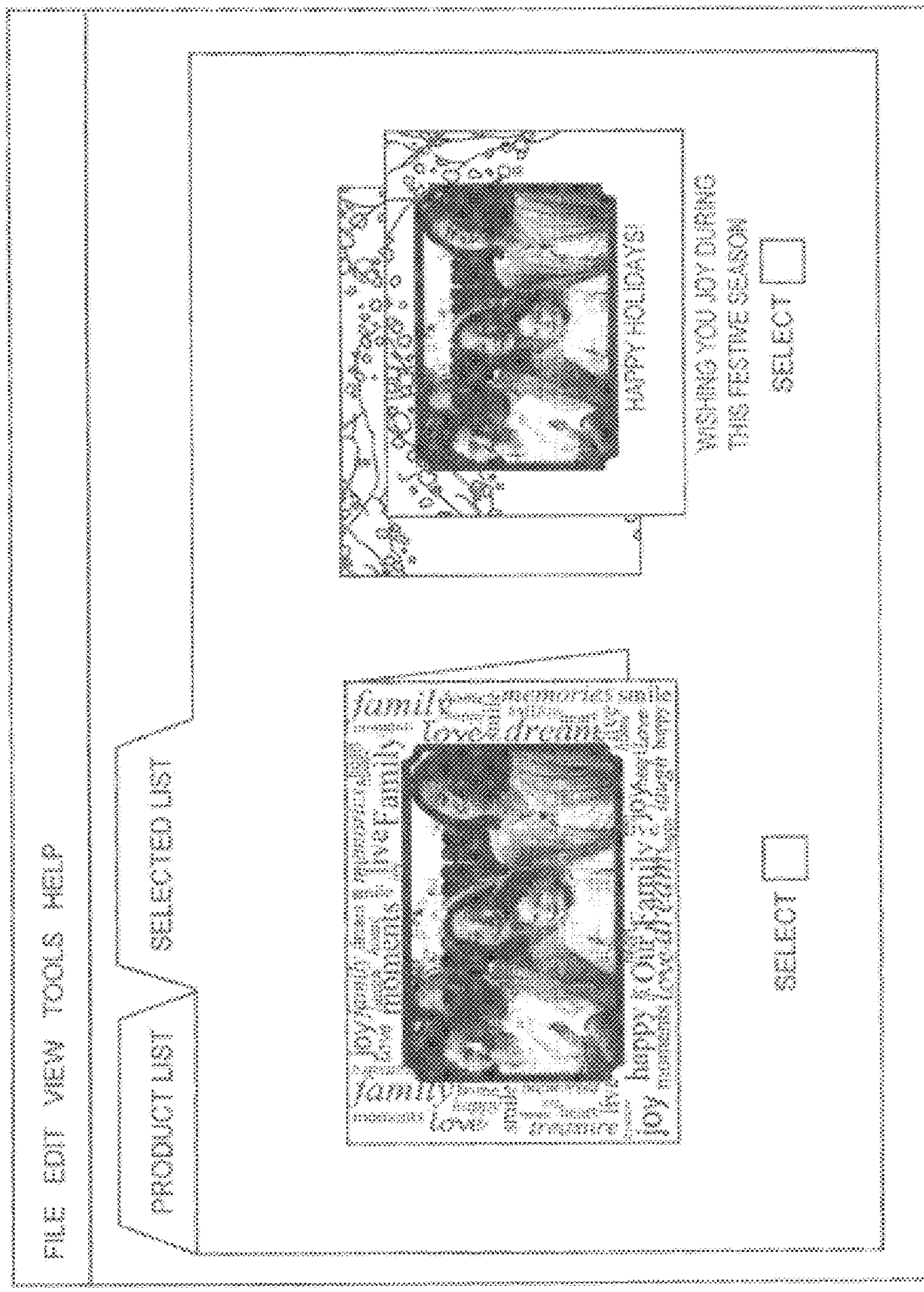
FIG. 5 illustrates the display of composited user images in a selected subset of image products in a browser tab according to a preferred embodiment of the present invention.

According to one preferred embodiment of the present invention, a user interacts through a web browser on a client computer with a remote web server computer that provides imaging services to the user. User images stored on a client computer can be uploaded from the client computer to the server computer and stored on the server computer. In one preferred embodiment of the present invention, a graphic user interface (GUI) is provided as a web-page browser and the selected subset of composited image product views displayed on a different web page than the different image product views. This facilitates user selection by displaying only the preferred choices. For example, the different web pages can be displayed on a different web-page-browser tab than the different image product views. This step can be repeated with successive selected subsets of image products and with user images composited with image products, as shown in FIGS. 4A-B. FIGS. 4A and 4B are each intended to illustrate a separate screen presentation displaying only image products that were previously selected in the GUI. In this example, as the number of selected image products decreases, the display of the image product becomes larger and more comparable to an actual size of the image product.

The present invention provides an advantage over methods found in the prior art by compositing preferred image products with user images to provide an improved understanding of the image product to a user. By displaying the preferred composited image products separately from the remainder of the image products, selection is made easier. Also, by compositing images into only those preferred image products that are displayed, computational intensity is reduced.

According to another preferred embodiment of the present invention, a computer system for selecting from a large set of personalized-image-product choices comprises a computer with a display and graphic user interface (GUI) software for displaying images and image products in the graphic user interface, as shown in FIGS. 1 and 2. The computer system includes software for providing and displaying a plurality of image products, software for receiving one or more images from a user through the GUI, software for selecting a subset of the displayed image products, software for compositing a received image into each of the displayed image products in the selected subset to form a composited image product view for each of the selected image products, software for displaying the composited image product views in the GUI separately from the unselected image product views, and software for selecting a desired composited image product from the selected subset of displayed composited image product views. The computer system includes means for making the selected image product with the corresponding received image, for example using a printer attached directly to the computer or a printer available over a network.

The computer system can include a server computer connected to a remote client computer through a computer network that provides communications between the server computer and the remote client computer. In one preferred embodiment of the present invention, the remote client computer includes a browser and the server computer includes web pages that are provided to the remote client computer through the computer network. Software for selecting a received image from a stored set of user images is employed, in another preferred embodiment. Software for assigning a preferred status to each of the selected image products is included in yet another preferred embodiment. Software for purchasing the selected image product, for example provided through electronic internet transaction services, is employed in one preferred embodiment.

A variety of graphic user interfaces can be employed, for example one including software for displaying the selected subset of composited image product views on a different web page than the different image product views or for displaying the different web page on a different web-page-browser tab than the different image product views.

In another preferred embodiment of the present invention, software for selecting from a large set of personalized-image-product choices comprises software for interacting with a remote client computer through a computer network, the remote client computer having a graphical user interface (GUI), software for receiving one or more images, software for displaying a plurality of different image products in the GUI on the remote client computer, software for selecting a subset of the displayed image products, software for compositing a received image into each of the displayed image products in the selected subset to form a composited image product view for each of the selected image products, software for displaying the composited image product views in the GUI separately from the unselected image product views, software for selecting a desired displayed composited image product, and software for making the selected image product with the corresponding received image. The software can include web pages that are provided to the remote client computer through the computer network, software for selecting a received image from a stored set of user images, software for assigning a preferred status to each of the selected image products, software for purchasing the selected image product, and software for displaying the selected subset of composited image product views on a different web page than the different image product views.

As used herein, an image product can be a multi-media product, incorporating multiple different visual and auditory elements, both still and dynamic. According to various preferred embodiments of the present invention, a multi-media product is an image product that includes a user's personalized images incorporated into an image-related object, such as for example a photo-book, a greeting card, a mug, or other image-related product. The images can be still images or image sequences, such as videos, and the multi-media product can include other media features, for example audio tracks, sounds, or sound sequences. A multi-media product can be a hard-copy product, for example a printed image together with an audio playback capability, or an electronic product, for example in an on-line album with still images, multiple still images, image sequences, sounds, a sequence of sounds, or audio tracks, or all of these. For simplicity and clarity of discussion, still images are described herein, but it is to be understood that the methods and objects described can include multi-media products that include images and can be either hard-copy or electronic and that the present invention includes these various preferred embodiments.

Image products and templates can also include multiple pages. Received images do not necessarily have to be composited in all image locations. In general, a cover or a single page is displayed and can include multiple images on that page. Hence, according to a preferred embodiment of the present invention, multiple received images can be composited into selected image products.

The invention has been described in detail with particular reference to certain preferred embodiments thereof, but it will be understood that variations and modifications can be effected within the spirit and scope of the invention.

PARTS LIST

20 system
22 housing
24 source of content data files
26 user input system
27 graphic user interface
28 output system
29 printer
30 tangible surface
34 processor
35 remote system
38 sensors
39 video sensors
40 memory
42 hard drive
44 disk drive
46 memory card slot
48 removable memory
50 memory interface
52 remote memory system
54 communication system
56 remote display
58 remote input
**58*a*** remote keyboard
**58*b*** remote mouse
**58*c*** remote control
66 local display
68 local input
**68*a*** local keyboard
**68*b*** local mouse
70 home computer, editing studio, or kiosk
72 user
74 audio sensors
80 image product
82 selection box
84 selected image product
86 composited image product view
87 received user image
88 selected composited image product
100 provide GUI step
105 provide and display image products step
110 receive images step
115 select image product subset step

120 composite received images into selected image products step

125 display composited image products step

130 select composited image product step

135 make selected composited image product step

140 sell selected composited image product step

The invention claimed is:

1. A computer system comprising:

a communications interface;

an input system comprising a graphic user interface (GUI);

an output system;

one or more processors; and a non-transitory computer-readable storage medium containing instructions that, when executed by the one or more processors, cause the system to:

receive from the input system, via the GUI, content data files to be used in generating an image-enhanced output product;

receive from the input system a selection of an output form for the image-enhanced output product, wherein the output form comprises output form locations for images;

receive from the input system at least one type of content data file information selected from the group consisting of: audience information, annotation data, and character identification data;

identify a subset of images from the content data files, wherein identifying the subset of images is based on the received content data file information;

adaptively adjust one or more image attributes to accommodate positioning the images into specified output form locations, wherein adaptively adjusting the images comprises adjusting one or more image attributes selected from the group consisting of: image size, image aspect ratio, and image orientation;

generate composite renderings of the image-enhanced output product featuring the images adaptively adjusted and positioned into the specified output form locations;

automatically determine a preferred status for each of the composite renderings based on criterion including matching colors, content, or image quality of the respective representations of the image-enhanced output product comprising the adaptively adjusted images and the specified output form;

determine a sort order for each of the composite renderings based on the preferred status;

present, on the display, composite renderings that have the preferred status in a single area in the GUI while not displaying the remaining composite renderings of the image-enhanced output product;

receive from the input system, via the GUI, instructions to transact a sale for the purchase of the image-enhanced output product presented on the display; and fabricate the image-enhanced output product.

2. The computer system of claim 1, wherein the GUI enables image editing methods selected from the group consisting of: image size editing, cropping, image orientation editing, and image aspect ratio editing.

3. The computer system of claim 1 wherein the communication interface comprises a subsystem to convert the content data files into a form that can be conveyed to a remote device using an optical signal, radio frequency signal, or other form of signal, wherein the subsystem receives a digital image from a remote input system.

4. The computer system of claim 1 wherein the computer system is operatively connected to a remote input system via internet access, and wherein the computer system receives content data files from the remote input system through a web browser or web services.

5. The computer system of claim 1, wherein the image-enhanced output product is selected from the group consisting of: a photo-book, a picture greeting card, and a picture mug.

6. The computer system of claim 1, wherein the GUI enables a user to arrange, organize and edit content data files to be incorporated into the image-enhanced output product.

7. The computer system of claim 2 wherein the output system fabricates the image-enhanced output product and makes the image-enhanced output product from rendered images, text, and other graphical representations in combination.

8. The computer system of claim 1 wherein the non-transitory computer-readable storage medium containing instructions, when executed by the one or more processors, further cause the computer system to generate a specification of the image-enhanced output product that is usable by the output system to fabricate the image-enhanced output product.

9. The computer system of claim 1 wherein the input system comprises a touch screen display to control the GUI.

10. The computer system of claim 1 wherein the input system comprises voice recognition.

11. The computer system of claim 1 wherein the output system comprises an output device selected from the group consisting of: a thermal printer, a dry electrography printer, and an inkjet printer.

12. The computer system of claim 1 wherein the instructions to transact a sale for the purchase of the image-enhanced output product are received through electronic internet transaction services.

13. The computer system of claim 1 wherein the content data files comprise images derived from an image capture device, wherein the image capture device is remotely and operatively connected to the computer system.

14. The computer system of claim 1 wherein the content data files are derived from a variety of sources selected from the group consisting of: a stored set of user images on a client computer and a stored set of user images on a web server operated by an image product service provider.

15. The computer system of claim 1 wherein the computer system communicates the displayed composite rendering of the image-enhanced output product to third parties for approval, review, sale, and for making modifications to the composite rendering of the image-enhanced output product.

16. The computer system of claim 15 wherein the non-transitory computer-readable storage medium containing instructions, when executed by the one or more processors, further cause the computer system to communicate the displayed composite rendering of the image-enhanced output product or a web page link to the composite rendering of the image-enhanced output product to a third party.

17. The computer system of claim 8 wherein the output system includes means for fabricating the image-enhanced output product.

18. The computer system of claim 1 further comprising a housing, an electronic system, and a source of content data files, wherein the electronic system and the source of the content data files are positioned within the housing and the input system and the output system are positioned outside of the housing.

* * * * *